(12) United States Patent
Wozniak et al.

(10) Patent No.: US 10,534,668 B2
(45) Date of Patent: Jan. 14, 2020

(54) ACCESSING DATA IN A DISPERSED STORAGE NETWORK

(71) Applicant: International Business Machines Corporation, Armonk, NY (US)

(72) Inventors: Ethan S. Wozniak, Park Ridge, IL (US); Andrew D. Baptist, Mt. Pleasant, WI (US); Greg R. Dhuse, Chicago, IL (US); Ilya Volvovski, Chicago, IL (US); Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 127 days.

(21) Appl. No.: 15/832,391

(22) Filed: Dec. 5, 2017

(65) Prior Publication Data

US 2018/0095826 A1    Apr. 5, 2018

Related U.S. Application Data

(63) Continuation-in-part of application No. 15/818,633, filed on Nov. 20, 2017, which is a
(Continued)

(51) Int. Cl.
*G06F 11/10* (2006.01)
*G06F 3/06* (2006.01)

(52) U.S. Cl.
CPC .......... *G06F 11/1076* (2013.01); *G06F 3/064* (2013.01); *G06F 3/067* (2013.01); *G06F 3/0619* (2013.01)

(58) Field of Classification Search
CPC .... G06F 11/1076; G06F 3/067; G06F 3/0619; G06F 3/064
See application file for complete search history.

(56) References Cited

U.S. PATENT DOCUMENTS

| 4,092,732 A | 5/1978 | Ouchi |
| 5,454,101 A | 9/1995 | Mackay et al. |
(Continued)

OTHER PUBLICATIONS

Shamir; How to Share a Secret; Communications of the ACM; vol. 22, No. 11; Nov. 1979; pp. 612-613.
(Continued)

*Primary Examiner* — Phung M Chung
(74) *Attorney, Agent, or Firm* — Garlick & Markison; Timothy W. Markison; Bruce E. Stuckman (57) ABSTRACT

A method for execution by a computing device includes generating a data segment to include a first data object for storage and a plurality of null data objects. The data segment is dispersed storage error encoded to produce a set of encoded data slices that includes a first encoded data slice that corresponds to the first data object, a plurality of null slices corresponding to the null data objects, and a remaining number of error coded slices. Storage of the set of encoded data slices in a set of storage units is facilitated. Storage of a second data object is facilitated, where one null data object is overwritten with the second data object. A partial contribution of the second data object is calculated for each of the error coded slices in accordance with a partial encoding approach. Each error coded slice is updated by utilizing the corresponding partial contribution.

20 Claims, 6 Drawing Sheets

Related U.S. Application Data continuation-in-part of application No. 14/984,024, filed on Dec. 30, 2015, now Pat. No. 10,078,472.

(60) Provisional application No. 62/121,736, filed on Feb. 27, 2015.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Raiford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 9,110,833 | B2 | 8/2015 | Gladwin et al. |
| 9,727,275 | B2 | 8/2017 | Kazi |
| 10,241,864 | B2 * | 3/2019 | Baptist .............. G06F 11/1092 |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0029524 | A1 * | 2/2011 | Baptist ................ G06F 11/1076 707/737 |
| 2012/0254691 | A1 * | 10/2012 | Resch ................ G06F 11/1044 714/763 |
| 2014/0331086 | A1 | 11/2014 | Resch |
| 2017/0147428 | A1 | 5/2017 | Volvovski et al. |
| 2017/0300374 | A1 | 10/2017 | Gladwin et al. |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th USENIX Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Confer- (56) References Cited

OTHER PUBLICATIONS ence on Architectural Support for Programming Languages and Operating Systems (ASPLOS 2000); Nov. 2000; pp. 1-12.

* cited by examiner

ACCESSING DATA IN A DISPERSED STORAGE NETWORK

CROSS-REFERENCE TO RELATED APPLICATIONS

The present U.S. Utility Patent Application claims priority pursuant to 35 U.S.C. § 120 as a continuation-in-part of U.S. Utility application Ser. No. 15/818,633, entitled "UTILIZING MULTIPLE STORAGE POOLS IN A DISPERSED STORAGE NETWORK", filed Nov. 20, 2017, which is a continuation-in-part of U.S. Utility application Ser. No. 14/984,024, entitled "REBUILDING ENCODED DATA SLICES IN A DISPERSED STORAGE NETWORK", filed Dec. 30, 2015, which claims priority pursuant to 35 U.S.C. § 119(e) to U.S. Provisional Application No. 62/121,736, entitled "TRANSITIONING A STATE OF A DISPERSED STORAGE NETWORK", filed Feb. 27, 2015, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
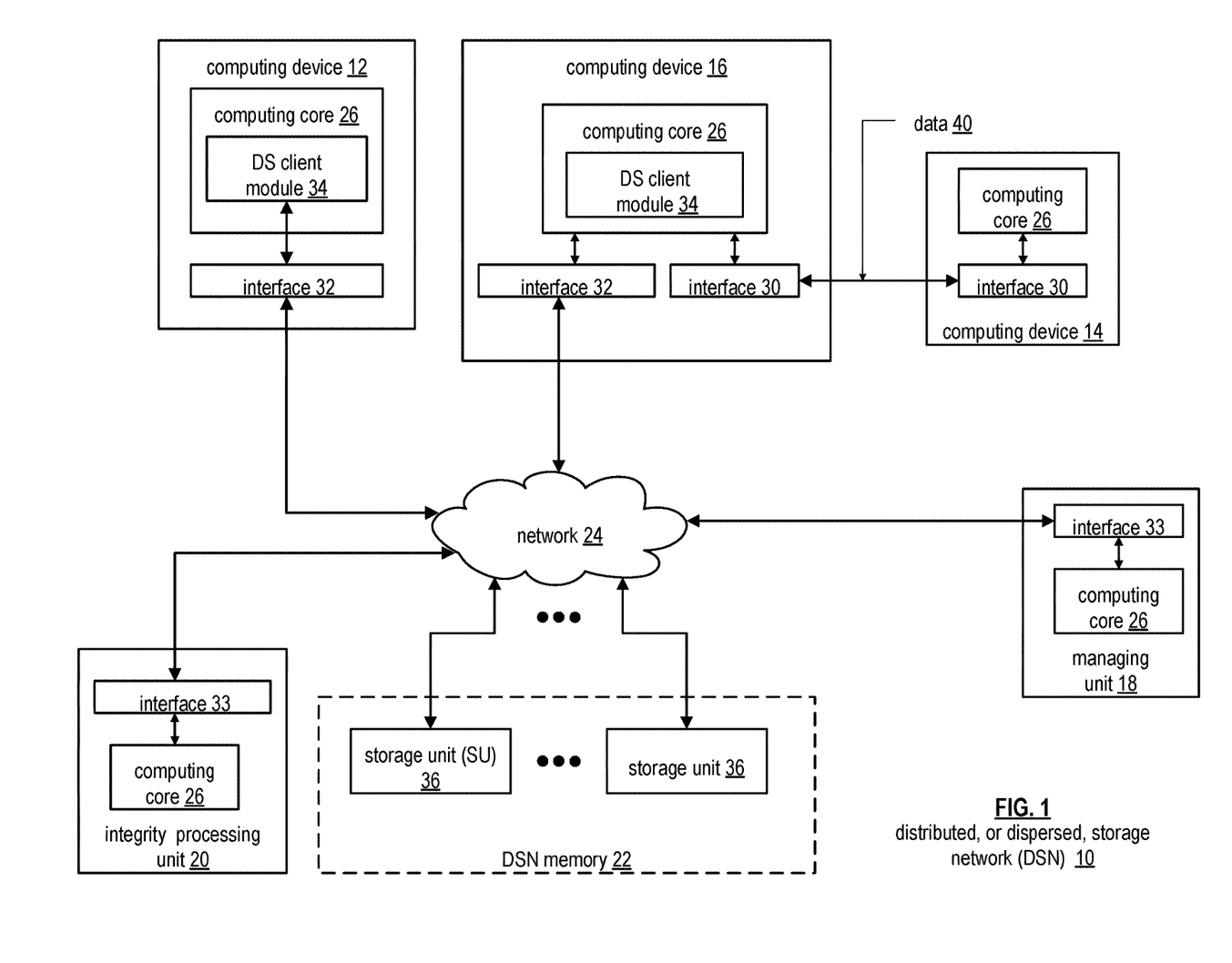
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
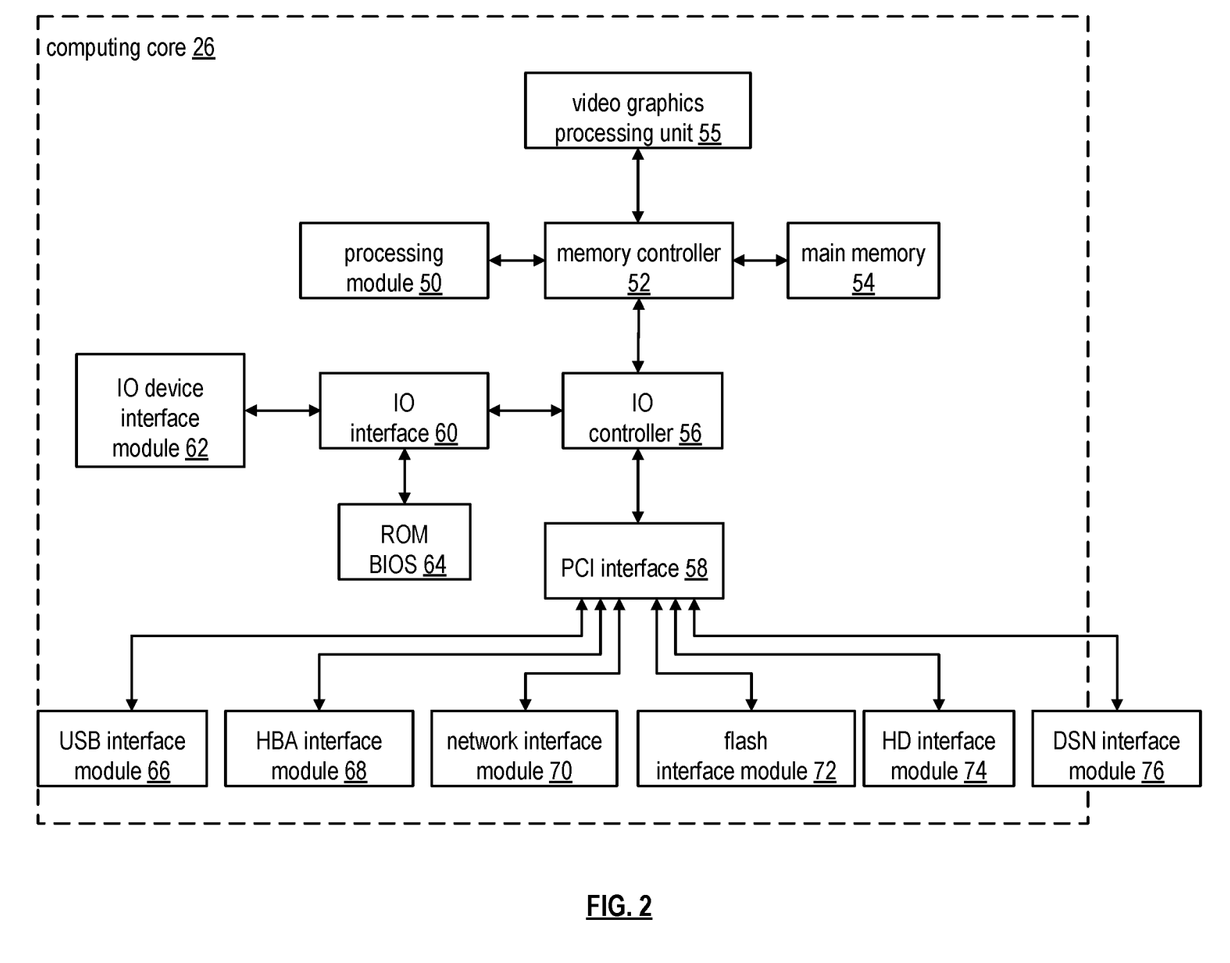
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figure 3:
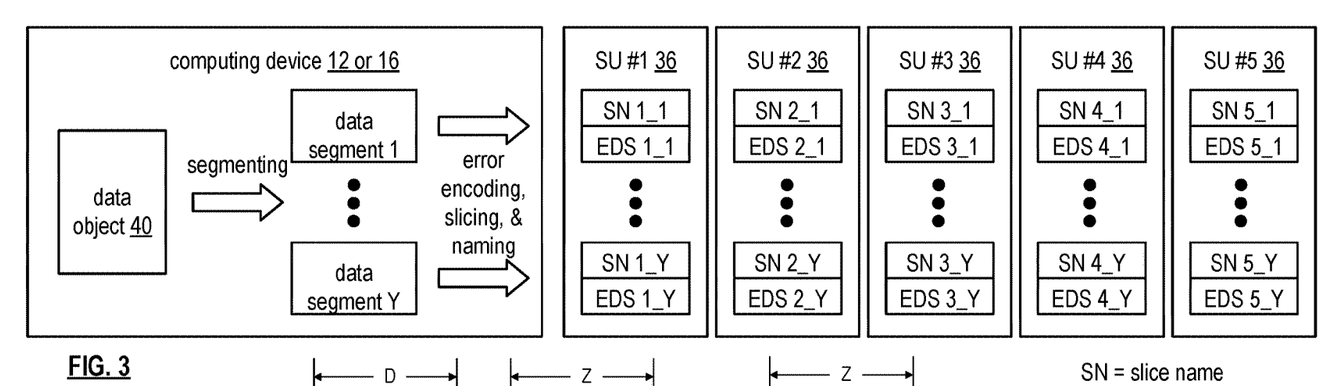
FIG. 3 is a schematic block diagram of an example of dispersed storage error encoding of data in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per portion of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 4:
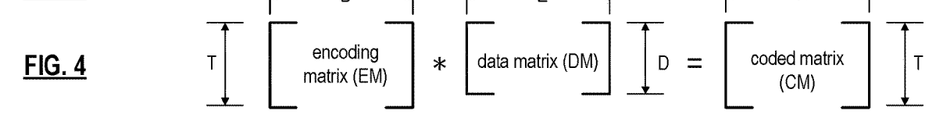
FIG. 4 is a schematic block diagram of a generic example of an error encoding function in accordance with the present invention.
Figure 5:
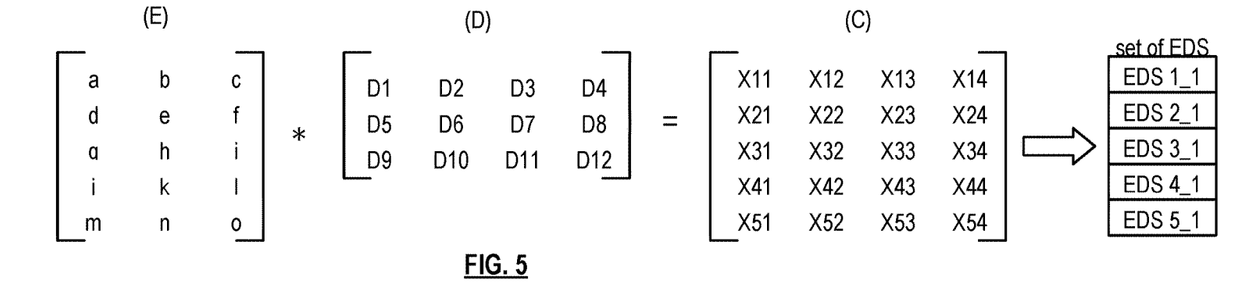
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
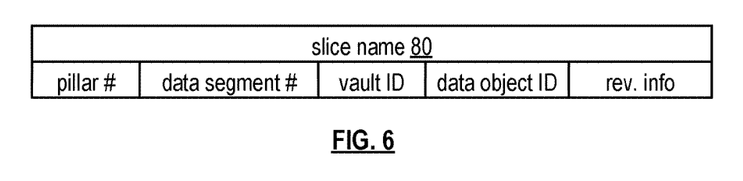
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
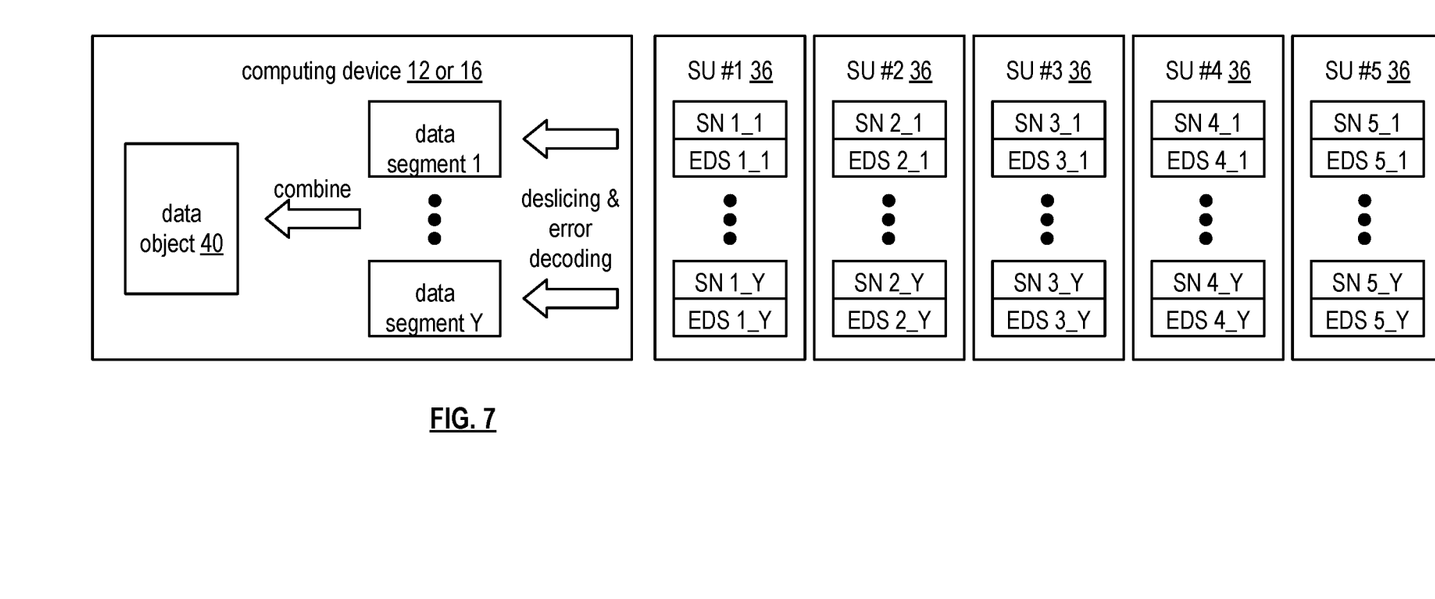
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
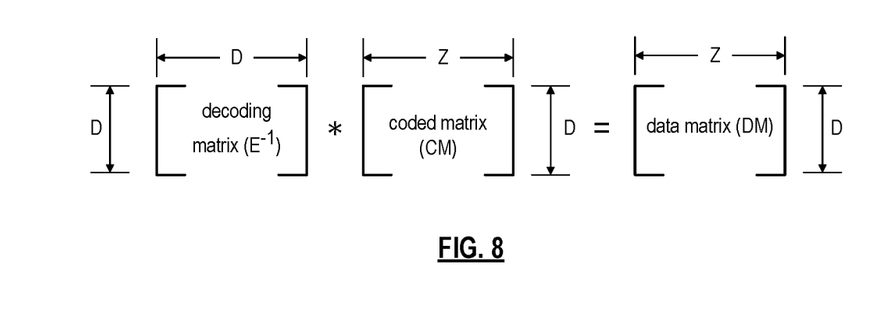
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
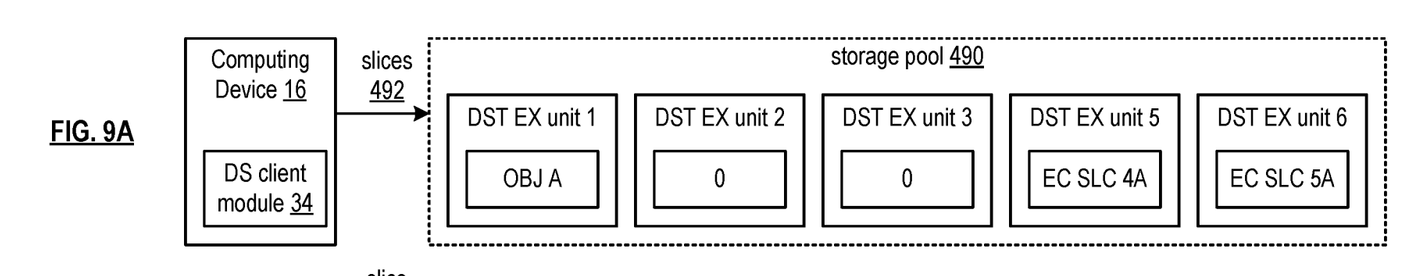
FIG. 9A is a schematic block diagram of an embodiment of a dispersed or distributed storage network (DSN) in accordance with the present invention.
Figure 9B:
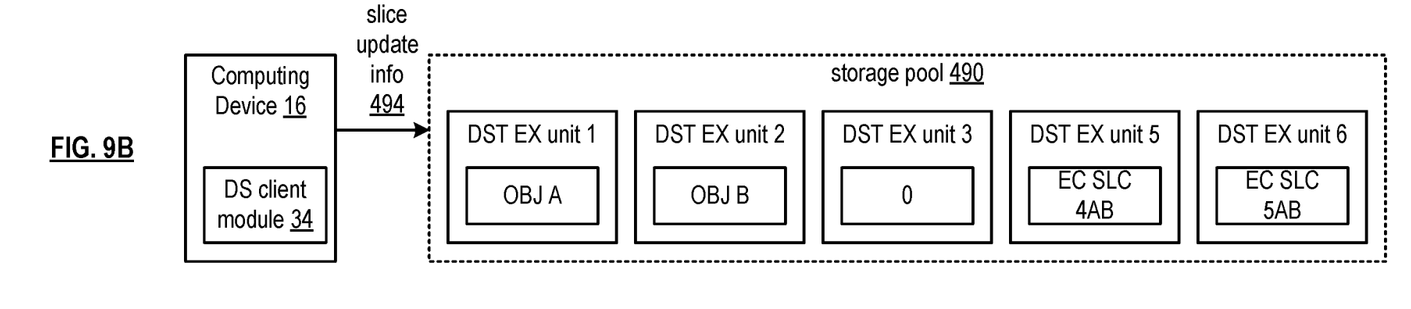
FIG. 9B is a schematic block diagram of an embodiment of a dispersed or distributed storage network (DSN) in accordance with the present invention.

FIGS. 9A and 9B are schematic block diagrams of another embodiment of a dispersed storage network (DSN) that includes the computing device 16 of FIG. 1 and a storage pool 490. The computing device 16 includes the DST client module 34 of FIG. 1. The storage pool includes a set of DST execution (EX) units 1-6 when dispersal parameters of a dispersed storage error coding function utilized to store data in the set of DST execution units includes an information dispersal algorithm (IDA) width n=6. Each DST execution unit may be implemented utilizing the storage unit 36 of FIG. 1. The DSN functions to access data in the storage pool. The accessing includes storing the data in the storage pool and retrieving the data from the storage pool. The data may include one or more data objects. FIG. 9A illustrates steps of an example of storing the data in the storage pool where the DS client module 34 generates a data segment to include a first data object A for storage and one or more future data objects, where a decode threshold number of data objects includes the first data object A and the one or more future data objects and where the dispersal parameters further includes the decode threshold number. The DS client module 34 generates each of the one or more future data objects to include all zeros. The DS client module 34 can generate the data segment to include the first data object A and all zeros for a decode threshold number k minus one, which dictates a number of future data objects. For instance, the DS client module 34 generates two future data objects of all zeros when the decode threshold number is three.

Having generated the data segment, the DS client module 34 can dispersed storage error encode the data segment utilizing the dispersed storage error coding function and the dispersal parameters to produce a set of encoded data slices 492, where the dispersed storage error coding function includes matrix multiplication of the data segment by an encoding matrix and where the encoding matrix includes a unity matrix in a most significant number of a decode threshold number of rows. For instance, the DS client module 34 generates a set of encoded data slices to include a first encoded data slice that is essentially the same as the first data object A, a second encoded data slice that is all zeros, a third encoded data slice that is all zeros, a fourth encoded data slice (EC SLC) that is an error coded slice 4A corresponding to a fourth row of the encoding matrix, and a fifth encoded data slice (EC SLC) that is an error coded slice 5A corresponding to a fifth row of the encoding matrix.

Having produced the set of encoded data slices 492, the DST client module 34 facilitates storage of the set of encoded data slices 492 in the set of DST execution units of the storage pool. For example, the DST client module 34 generates a set of write slice requests that includes the set of encoded data slices 492 and sends the set of write slice requests to the storage pool. The sending may include transmitting the set of write slice requests via the network 24 of FIG. 1 to the DST execution units of the storage pool.

FIG. 9B illustrates further steps of the example of storing the data in the storage pool where the DST client module 34 facilitates storage of a second data object B as a future data object. For example, the DS client module 34 sends slice update information 494 that includes the second data object B to the DST execution unit 2 for storage, where the DST execution unit 2 performs an exclusive OR (XOR) function on the second data object B with a retrieved stored future data object (e.g., all zeros) and overwrites the stored future data object with the result of the XOR function. Alternatively or in addition, the DST execution unit 2 stores the received second data object B by overwriting the stored future data object.

For each stored n-k error coded slice, the DS client module 34 calculates a partial contribution of the second data object B in accordance with a partial encoding approach. For example, the DS client module 34 matrix multiplies a row of the encoding matrix that corresponds to the error coded slice by the second data object B to produce the partial contribution. For instance, the DS client module 34 matrix multiplies a fourth row of the encoding matrix by the second data object B to produce the partial contribution for the error coded slice 4A that is stored in the DST execution unit 5.

For each stored n-k error coded slice, the DS client module 34 facilitates updating of the slice utilizing the corresponding calculated partial contribution. The facilitating includes the DS client module 34 sending further slice update information 494 that includes the partial contribution to a corresponding DST execution unit, where the DST execution unit performs the XOR function on a corresponding stored error coded slice with the partial contribution to produce an updated error coded slice for overwriting of the error coded slice. For example, the DST client module 34 sends the partial contribution for the error coded slice 4A to the DST execution unit 5, where the DST execution unit 5 performs the XOR function on the error coded slice 4A with the received partial contribution for the error coded slice 4A to produce an updated error coded slice 4AB for overwriting of the error coded slice 4A.

Alternatively, or in addition to, recovery of a data object includes accessing a corresponding DST execution unit to recover the data object (e.g., issuing a read slice request to DST execution unit 2 to recover the second data object B) or, when the data object is unavailable directly (e.g., a storage error is associated with storage of the second data object B), recovering a decode threshold number of encoded data slices of the set of encoded data slices (e.g., encoded data slices 1, 3, and 5), and dispersed storage error decoding the decode threshold number of encoded data slices to reproduce the desired data object.

In an example embodiment, computation of updates to individual slices can be performed in isolation of knowledge of the content of any other slice, using "Partial Rebuilding" techniques. This can enable efficient storage of small objects within slices (using wide IDAs) while retaining efficient IO access to these small objects. This idea involves three new concepts, "grouped objects" (multiple objects stored together as related slices), "zeroed slices" (slices which have a certain length but are composed entirely of bits which are all 0s), and a new protocol message "XOR_Slice", which can contain a slice name, expected revision, new revision, and string of bits. When a storage unit 36 receives an XOR_Slice request, it can read the most recent version of the slice it has for that slice name, ensures that the expected revision in the request matches the current vision of the slice, if it doesn't then a check error is returned. If it does match, the storage unit will then read that slice revision and ensure the length of the slice matches the length of the string of bits in the request. If it does not match, then the storage unit will return a length_mismatch error. If it does match then the storage unit will form a new stream of bits from performing a bit-wise exclusive-or of the current slice's contents XORed with the string of bits from the request. It will then store the result as a new slice having the revision specified in the XOR_Slice request.

A computing device 16, which wants to store many small objects in an efficient and reliable way (using a wide IDA), can store the slices as follows:

First, when the first slice having a size in between some MIN and MAX bound comes in to be stored, generate a new "grouped object" with a total source size equal to IDA_Threshold*MAX. Second, the computing device can create a grouped object by encoding through an IDA a grouped object formed as the concatenation of that first slice, together with (IDA_Threshold−1) zeroed slices. Third, the computing device can process this grouped through the IDA to produce a width number of slices and store them to the storage units as normal. Fourth, when a next slice comes in having a size between MIN and MAX, the computing device can determine whether there are any unfilled (grouped objects which have at least one remaining zeroed slice) grouped objects on the system. If there are not any then return to the first step and treat this as a first slice to be stored generating a new grouped object, otherwise, select an existing grouped object and continue. Fifth, the computing device can determine at least one of the slices which is zeroed for this grouped object, and send a XOR_Slice request containing the content of that object to the storage unit responsible for this slice. Sixth, the computing device can compute the partial contribution of this slice for both the "code slice" positions (e.g. in a 10-of-15, the code slices are the final 5 computed slices). For example, if there are always write decode threshold (W) minus pillar width (T) code slices, then W-T partials are computing, and the results are sent within XOR_Slice requests to those storage units storing code slices. Seventh, at a future time, a slice may be deleting by repeating the sixth step which will cause the slice to revert to a zeroed slice, and the code slices to revert to what they were previously (since any string of bits XORed with itself is all zeros).

This can be represented in a 3-of-5 IDA, writing three objects A, B, and C, as follows:
1. No slices written:
- - - - -
2. Object A written, with 2 zeroed slices and 2 redundant slices at version 1:
[A][0][0][X_1][Y_1]
3. Object B written, causing redundant slices to be modified:
[A][B][0][X_2][Y_2]
4. Object C written in final open spot, causing redundant slices to be modified again:
[A][B][C][X_3][Y_3]
5. Object B deleted, creating a new open spot:
[A][0][C][X_4][Y_4]

Thus, all objects A, B, and C are stored with the same reliability as any other data stored in a 3-of-5 IDA configuration, and moreover, any one of those objects can be recovered in a single IO operation. E.g. object C can be read by sending a single read request to the third store.

Note that an additional enhancement may be made, where if an object is a multiple of the MAX, e.g. it is 20 KB when the max is 10 KB, it may be stored across 2 slices (rather than 1) which is still an improvement over having to read T slices to recover the object. Also note that a given computing device may have multiple ranges of MIN and MAX values, such that different sized objects get grouped with and stored as part of different grouped objects. The closer min and max are for each grouped object, the more efficiently the objects can be stored (there is less wasted overhead).

In various embodiments, a processing system of a computing device includes at least one processor and a memory that stores operational instructions, that when executed by the at least one processor cause the processing system to generate a data segment to include a first data object for storage and a plurality of null data objects. The data segment is dispersed storage error encoded to produce a set of encoded data slices. The set of encoded data slices includes a first encoded data slice that substantially corresponds to the first data object, a plurality of null slices corresponding to the plurality of null data objects, and a remaining number of error coded slices. Storage of the set of encoded data slices in a set of storage units is facilitated. Storage of a second data object is facilitated, where one of the plurality of null data objects is overwritten with the second data object. A partial contribution of the second data object is calculated for each of the error coded slices in accordance with a partial encoding approach. Each of the error coded slices is updated by utilizing the corresponding partial contribution.

In various embodiments, the data segment is dispersed storage error encoded by utilizing an information dispersal algorithm in accordance with dispersal parameters that include a pillar width number and a decode threshold number. A number of encoded data slices in the set of encoded data slices is equal to the pillar width number, a number of the plurality of null slices is equal to the decode threshold number minus one, and a number of the remaining number of error coded slices is equal to the pillar width number minus the decode threshold number.

In various embodiments, dispersed storage error encoding the data segment includes matrix multiplying the data segment by an encoding matrix to produce the set of encoded data slices. The encoding matrix includes a unity matrix, with a decode threshold number dimension, in a most significant number of rows. In various embodiments, calculating the partial contribution of the second data object includes matrix multiplying a corresponding row of the encoding matrix by the second data object to produce the partial contribution.

In various embodiments, storing the second data object includes generating an update slice request that includes the second data object. The update slice request is sent to a corresponding storage unit. The storage unit performs an exclusive OR function on the second data object and a one of the plurality of null slices corresponding to the one of the plurality of null data objects to produce a second encoded data slice for storage in the storage unit. In various embodiments, facilitating updating the error coded slice includes issuing an update slice request to a corresponding storage unit. The storage unit performs an exclusive OR function on the partial contribution and the error coded slice to produce an updated error coded slice for storage in the storage unit.

In various embodiments, the computing device determines to recover the first data object. A corresponding storage unit is accessed in response to determining the first data object is available directly. A decode threshold number of encoded data slices of the set of encoded data slices are recovered, and the decode threshold number of encoded data slices are dispersed storage error decoded to reproduce the first data object in response to determining the first data object is not available directly.

Figure 10:
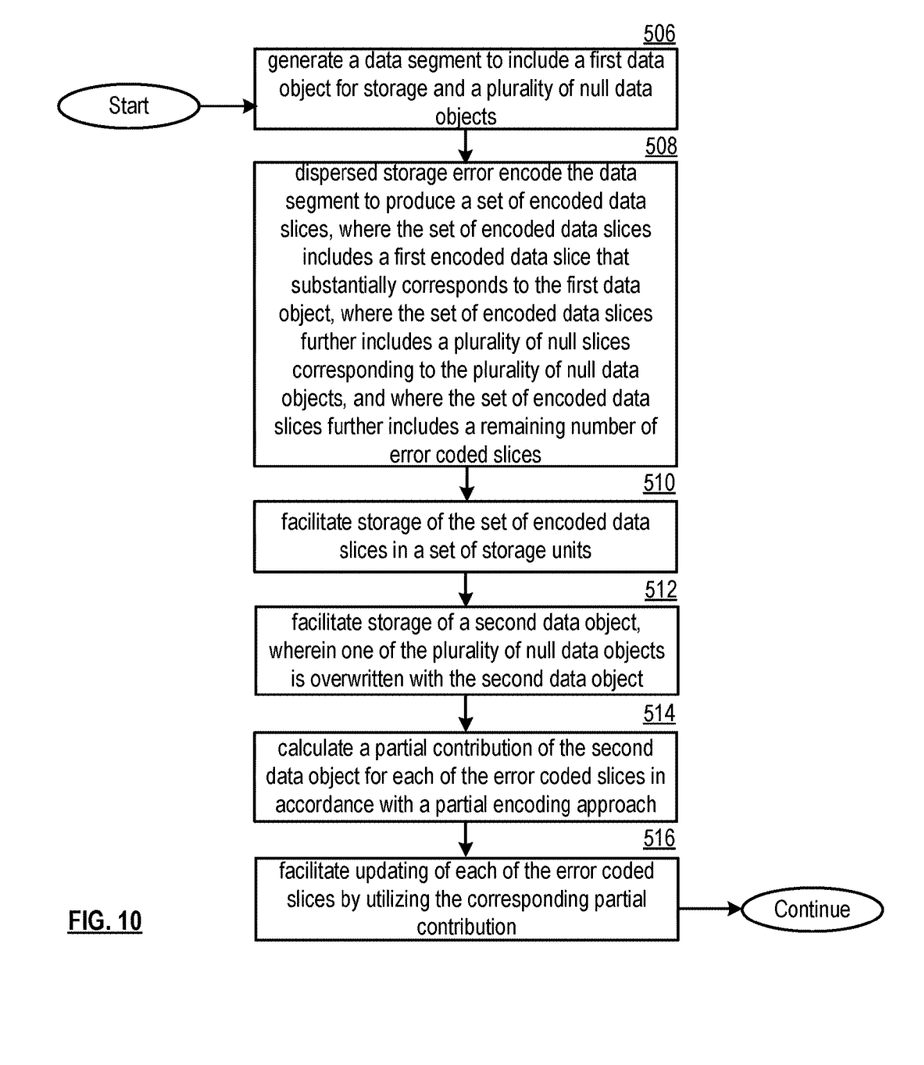
FIG. 10 is a logic diagram of an example of a method of accessing data in accordance with the present invention.

FIG. 10 is a flowchart illustrating an example of accessing data. In particular, a method is presented for use in association with one or more functions and features described in conjunction with FIGS. 1-9B, for execution by a computing device that includes a processor or via another processing system of a dispersed storage network that includes at least one processor and memory that stores instruction that configure the processor or processors to perform the steps described below.

The method includes step 506 where a processing system (e.g., of a distributed storage (DS) client module and/or a computing device) generates a data segment to include a first data object for storage in one or more future null data objects. For example, the processing system establishes the data segment such that a first encoded data slice is substantially the same as the first data object and further future null data objects are all zeros.

The method continues at step 508 where the processing system dispersed storage error encodes the data object to produce a set of encoded data slices, where a first encoded data slice is substantially the same as the first data object and where the set of encoded data slices includes n-k error coded slices. For example, the processing system matrix multiplies the data segment by an encoding matrix, where the encoding matrix includes a unity matrix, with a decode threshold number dimension, in a most significant number of rows, to produce the set of encoded data slices.

The method continues at step 510 where the processing system facilitates storage of the set of encoded data slices in a set of storage units. For example, the processing system sends the set of encoded data slices to the set of storage units for storage. The method continues at step 512 where the processing system facilitates storage of a second data object, where a null data object is overwritten with the second data object. For example, the processing system generates an update slice request to include the second data object, where a second encoded data slice is to be substantially the same as the second data object, and sends the update slice request to a corresponding storage unit where the storage unit performs an exclusive OR function on the corresponding null data object with the second data object to produce a second encoded data slice for storage.

For each of the error coded slices, the method continues at step 514 where the processing system calculates a partial contribution of the second data object in accordance with a partial encoding approach. For example, the processing system matrix multiplies a corresponding row of the encoding matrix by the second data object to produce the partial contribution. For each of the error coded slices, the method continues at step 516 where the processing system facilitates updating the error coded slice utilizing a corresponding partial contribution. For example, the processing system issues an update slice request to a corresponding storage unit where the storage unit performs the exclusive OR function on the partial contribution with the stored error coded slice to produce an updated error coded slice for storage in the storage unit.

Alternatively or in addition, recovery of a data object includes accessing a corresponding storage unit to recover the data object or, when the data object is unavailable directly, recovering a decode threshold number of encoded data slices of the set of encoded data slices and dispersed storage error decoding the decode threshold number of encoded data slices to reproduce the desired data object.

In various embodiments, a non-transitory computer readable storage medium includes at least one memory section that stores operational instructions that, when executed by a processing system of a dispersed storage network (DSN) that includes a processor and a memory, causes the processing system to generate a data segment to include a first data object for storage and a plurality of null data objects. The data segment is dispersed storage error encoded to produce a set of encoded data slices. The set of encoded data slices includes a first encoded data slice that substantially corresponds to the first data object, a plurality of null slices corresponding to the plurality of null data objects, and a remaining number of error coded slices. Storage of the set of encoded data slices in a set of storage units is facilitated. Storage of a second data object is facilitated, where one of the plurality of null data objects is overwritten with the second data object. A partial contribution of the second data object is calculated for each of the error coded slices in accordance with a partial encoding approach. Each of the error coded slices is updated by utilizing the corresponding partial contribution.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing system", "processing module", "processing circuit", "processor", and/or "processing unit" may be used interchangeably, and may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing system, processing module, module, processing circuit, and/or processing unit may be, or further include, memory and/or an integrated memory element, which may be a single memory device, a plurality of memory devices, and/or embedded circuitry of another processing system, processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing system, processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing system, processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing system, processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a computing device that includes a processor, the method comprises:
   generating a data segment to include a first data object for storage and a plurality of null data objects;
   dispersed storage error encoding the data segment to produce a set of encoded data slices, wherein the set of encoded data slices includes a first encoded data slice that substantially corresponds to the first data object, wherein the set of encoded data slices further includes a plurality of null slices corresponding to the plurality of null data objects, and wherein the set of encoded data slices further includes a remaining number of error coded slices;
   facilitating storage of the set of encoded data slices in a set of storage units;
   facilitating storage of a second data object, wherein one of the plurality of null data objects is overwritten with the second data object;
   calculating a partial contribution of the second data object for each of the error coded slices in accordance with a partial encoding approach; and
   facilitating updating of each of the error coded slices by utilizing the corresponding partial contribution.

2. The method of claim 1, wherein the data segment is dispersed storage error encoded by utilizing an information dispersal algorithm in accordance with dispersal parameters that include a pillar width number and a decode threshold number, wherein a number of encoded data slices in the set of encoded data slices is equal to the pillar width number, wherein a number of the plurality of null slices is equal to the decode threshold number minus one, and wherein a number of the remaining number of error coded slices is equal to the pillar width number minus the decode threshold number.

3. The method of claim 1, wherein dispersed storage error encoding the data segment includes matrix multiplying the data segment by an encoding matrix to produce the set of encoded data slices, and wherein the encoding matrix includes a unity matrix, with a decode threshold number dimension, in a most significant number of rows.

4. The method of claim 3, wherein calculating the partial contribution of the second data object includes matrix multiplying a corresponding row of the encoding matrix by the second data object to produce the partial contribution.

5. The method of claim 1, wherein storing the second data object includes:
   generating an update slice request that includes the second data object; and
   sending the update slice request to a corresponding storage unit, wherein the storage unit performs an exclusive OR function on the second data object and a one of the plurality of null slices corresponding to the one of the plurality of null data objects to produce a second encoded data slice for storage in the storage unit.

6. The method of claim 1, wherein facilitating updating the error coded slice includes issuing an update slice request to a corresponding storage unit, wherein the storage unit performs an exclusive OR function on the partial contribution and the error coded slice to produce an updated error coded slice for storage in the storage unit.

7. The method of claim 1, further comprising:
   determining to recover the first data object;
   accessing a corresponding storage unit in response to determining the first data object is available directly; and
   recovering a decode threshold number of encoded data slices of the set of encoded data slices and dispersed storage error decoding the decode threshold number of encoded data slices to reproduce the first data object in response to determining the first data object is not available directly.

8. A processing system of a computing device comprises:
   at least one processor;
   a memory that stores operational instructions, that when executed by the at least one processor cause the processing system to:
     generate a data segment to include a first data object for storage and a plurality of null data objects;
     dispersed storage error encode the data segment to produce a set of encoded data slices, wherein the set of encoded data slices includes a first encoded data slice that substantially corresponds to the first data object, wherein the set of encoded data slices further includes a plurality of null slices corresponding to the plurality of null data objects, and wherein the set of encoded data slices further includes a remaining number of error coded slices;
     facilitate storage of the set of encoded data slices in a set of storage units;
     facilitate storage of a second data object, wherein one of the plurality of null data objects is overwritten with the second data object;
     calculate a partial contribution of the second data object for each of the error coded slices in accordance with a partial encoding approach; and
     facilitate updating of each of the error coded slices by utilizing the corresponding partial contribution.

9. The processing system of claim 8, wherein the data segment is dispersed storage error encoded by utilizing an information dispersal algorithm in accordance with dispersal parameters that include a pillar width number and a decode threshold number, wherein a number of encoded data slices in the set of encoded data slices is equal to the pillar width number, wherein a number of the plurality of null slices is equal to the decode threshold number minus one, and wherein a number of the remaining number of error coded slices is equal to the pillar width number minus the decode threshold number.

10. The processing system of claim 8, wherein dispersed storage error encoding the data segment includes matrix multiplying the data segment by an encoding matrix to produce the set of encoded data slices, and wherein the encoding matrix includes a unity matrix, with a decode threshold number dimension, in a most significant number of rows.

11. The processing system of claim 10, wherein calculating the partial contribution of the second data object includes matrix multiplying a corresponding row of the encoding matrix by the second data object to produce the partial contribution.

12. The processing system of claim 8, wherein storing the second data object includes:
   generating an update slice request that includes the second data object; and
   sending the update slice request to a corresponding storage unit, wherein the storage unit performs an exclusive OR function on the second data object and a one of the plurality of null slices corresponding to the one of the plurality of null data objects to produce a second encoded data slice for storage in the storage unit.

13. The processing system of claim 8, wherein facilitating updating the error coded slice includes issuing an update slice request to a corresponding storage unit, wherein the storage unit performs an exclusive OR function on the partial contribution and the error coded slice to produce an updated error coded slice for storage in the storage unit.

14. The processing system of claim 8, wherein the operational instructions, when executed by the at least one processor, further cause the processing system to:
   determine to recover the first data object;
   access a corresponding storage unit in response to determining the first data object is available directly; and
   recover a decode threshold number of encoded data slices of the set of encoded data slices and dispersed storage error decoding the decode threshold number of encoded data slices to reproduce the first data object in response to determining the first data object is not available directly.

15. A non-transitory computer readable storage medium comprises:
   at least one memory section that stores operational instructions that, when executed by a processing system of a dispersed storage network (DSN) that includes a processor and a memory, causes the processing system to:
   generate a data segment to include a first data object for storage and a plurality of null data objects;
   dispersed storage error encode the data segment to produce a set of encoded data slices, wherein the set of encoded data slices includes a first encoded data slice that substantially corresponds to the first data object, wherein the set of encoded data slices further includes a plurality of null slices corresponding to the plurality of null data objects, and wherein the set of encoded data slices further includes a remaining number of error coded slices;
   facilitate storage of the set of encoded data slices in a set of storage units;
   facilitate storage of a second data object, wherein one of the plurality of null data objects is overwritten with the second data object;
   calculate a partial contribution of the second data object for each of the error coded slices in accordance with a partial encoding approach; and
   facilitate updating of each of the error coded slices by utilizing the corresponding partial contribution.

16. The non-transitory computer readable storage medium of claim 15, wherein the data segment is dispersed storage error encoded by utilizing an information dispersal algorithm in accordance with dispersal parameters that include a pillar width number and a decode threshold number, wherein a number of encoded data slices in the set of encoded data slices is equal to the pillar width number, wherein a number of the plurality of null slices is equal to the decode threshold number minus one, and wherein a number of the remaining number of error coded slices is equal to the pillar width number minus the decode threshold number.

17. The non-transitory computer readable storage medium of claim 15, wherein dispersed storage error encoding the data segment includes matrix multiplying the data segment by an encoding matrix to produce the set of encoded data slices, and wherein the encoding matrix includes a unity matrix, with a decode threshold number dimension, in a most significant number of rows.

18. The non-transitory computer readable storage medium of claim 17, wherein calculating the partial contribution of the second data object includes matrix multiplying a corresponding row of the encoding matrix by the second data object to produce the partial contribution.

19. The non-transitory computer readable storage medium of claim 15, wherein storing the second data object includes:
   generating an update slice request that includes the second data object; and
   sending the update slice request to a corresponding storage unit, wherein the storage unit performs an exclusive OR function on the second data object and a one of the plurality of null slices corresponding to the one of the plurality of null data objects to produce a second encoded data slice for storage in the storage unit.

20. The non-transitory computer readable storage medium of claim 15, wherein facilitating updating the error coded slice includes issuing an update slice request to a corresponding storage unit, wherein the storage unit performs an exclusive OR function on the partial contribution and the error coded slice to produce an updated error coded slice for storage in the storage unit.

* * * * *